(12) United States Patent
Gupte

(10) Patent No.: US 6,877,338 B2
(45) Date of Patent: Apr. 12, 2005

(54) HEAT EXCHANGER FOR HIGH STAGE GENERATOR OF ABSORPTION CHILLER

(75) Inventor: Neelkanth S. Gupte, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/603,022

(22) Filed: Jun. 24, 2003

(65) Prior Publication Data

US 2004/0261446 A1 Dec. 30, 2004

Related U.S. Application Data

(62) Division of application No. 09/891,721, filed on Jun. 26, 2001, now Pat. No. 6,598,420.

(51) Int. Cl.[7] ............................................. F25B 33/00
(52) U.S. Cl. ..................... 62/497; 62/476; 62/238.3
(58) Field of Search ..................... 62/497, 476, 495, 62/238.1, 238.3; 165/66, 909

(56) References Cited

U.S. PATENT DOCUMENTS

| 4,548,048 A | 10/1985 | Reimann et al. |
| 5,546,760 A | 8/1996 | Cook et al. |
| 6,003,331 A | 12/1999 | Kohler et al. |

*Primary Examiner*—Chen Wen Jiang
(74) *Attorney, Agent, or Firm*—Wall Marjama & Bilinski LLP

(57) ABSTRACT

An absorption cooling machine of the type which uses a refrigerant and an absorbent and which includes a high stage generator, absorber, condenser, heat exchangers, and an evaporator and means for connecting the components to one another to form a closed absorption cooling system. The solution side of the high stage generator is fluidically divided into two sections with a partition plate whereby gas exiting one section at relatively high temperature is further cooled in a second section called a flue gas recuperator (FGR) to improve overall burner efficiency.

22 Claims, 9 Drawing Sheets

US 6,877,338 B2

HEAT EXCHANGER FOR HIGH STAGE GENERATOR OF ABSORPTION CHILLER

CROSS REFERENCE TO RELATED APPLICATION

This is a divisional application of U.S. Ser. No. 09/891,721, filed Jun. 26, 2001, now allowed, as U.S. Pat. No. 6,598,420 the entirety of which is incorporated herein by reference.

BACKGROUND OF THE INVENTION

The invention relates in general to an absorption cooling system and more specifically to an improved heat exchanger for a high stage generator of an absorption chiller.

A direct-fired, double effect, absorption chiller/heater consists of an evaporator, absorber, condenser, high and low stage generators, separator, solution heat exchanges, refrigerant/solution pumps, burner and gas train assembly, purge, controls and auxiliaries. Water is used as the refrigerant in vessels maintained under low absolute pressure (vacuum). In the cooling mode, the chiller operates on the principle that under vacuum, water boils at a low temperature, thereby cooling the chilled water circulating through the evaporator tubes. A refrigerant pump is used to circulate the refrigerant water over the evaporator tubes to improve heat transfer.

To make the cooling process continuous, the refrigerant vapor must be removed as it is produced. To accomplish this, a lithium bromide solution (which has a high affinity for water) is used to absorb the water vapor. As this process continues, the lithium bromide becomes diluted, reducing its absorption capacity. A solution pump then transfers this weak (diluted) solution to the generators where it is reconcentrated in 2 stages to boil off the previously absorbed water.

In the high stage generator a significant amount of energy is lost in the exhaust flue gas. There has always been a continuing need in the field for improved efficiency in operating absorption chillers.

It is therefore a further object of the present invention to provide an absorption system having improved efficiency.

It is a further object of the present invention to provide an improved high stage generator for an absorption chiller.

It is an another object of the present invention to provide a system which utilizes lost energy in flue gas exhaust through a system which utilizes a flue gas recuperator.

SUMMARY OF THE INVENTION

The present invention relates to a system for recovering energy remaining in the exhaust of a high stage generator.

According to the present invention, in a standard liquid tube type high stage generator, a partition plate is positioned toward the end of the heat exchanger dividing the high and low pressures of a high and low stage of a triple or double effect absorption chiller cycle. The section from the fire tube up to the partition plate brings down the flue temperature up to approximately 650 F for a triple effect and up to 400 F for a double effect cycle. There is significant amount of energy remaining in the exhaust, which is recovered by preheating or boiling solution at a lower pressure in the remaining section of the flue passage, called flue gas recuperator (FGR). The FGR is a flooded type heat exchanger. Although the liquid tubes of both high stage generator and FGR section are shown to be of the same height, the tubes of FGR may be taller in order to reduce solution charge. The saturated (or heated) solution or solution vapor mixture goes to a conventional lower stage generator where an effect of advanced absorption cycle is materialized by generating more vapor utilizing high pressure steam generated in the high stage generator. The primary object of the invention is to modify a conventional high stage generator of a specific tonnage double effect chiller for a triple effect system. Since a triple effect chiller will have a lower gas firing rate (due to higher COP), there is virtually no change in the flue side flow length; thus the net pressure drop will be lower (due to lower flow rate). The addition of partition plate adds only marginal cost to the generator, making it economical and compact.

BRIEF DESCRIPTION OF THE DRAWINGS

For a further understanding of these and objects of the invention, reference will be made to the following detailed description of the invention which is to be read in connection with the accompanying drawing, wherein.

DETAILED DESCRIPTION OF THE INVENTION

Figure 1:
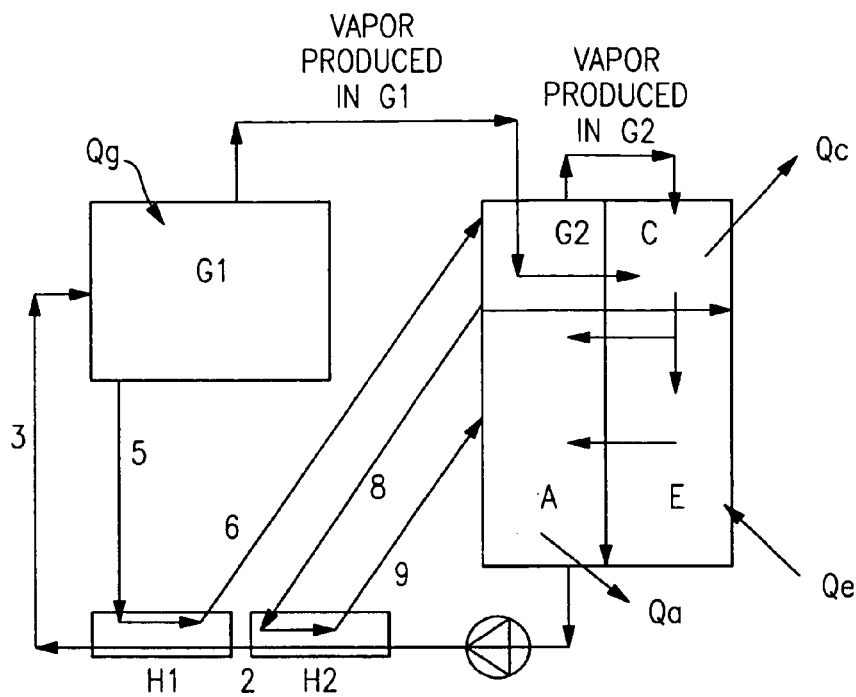
FIG. 1 illustrates a schematic for a forward-series absorption chiller cycle.
Figure 2:
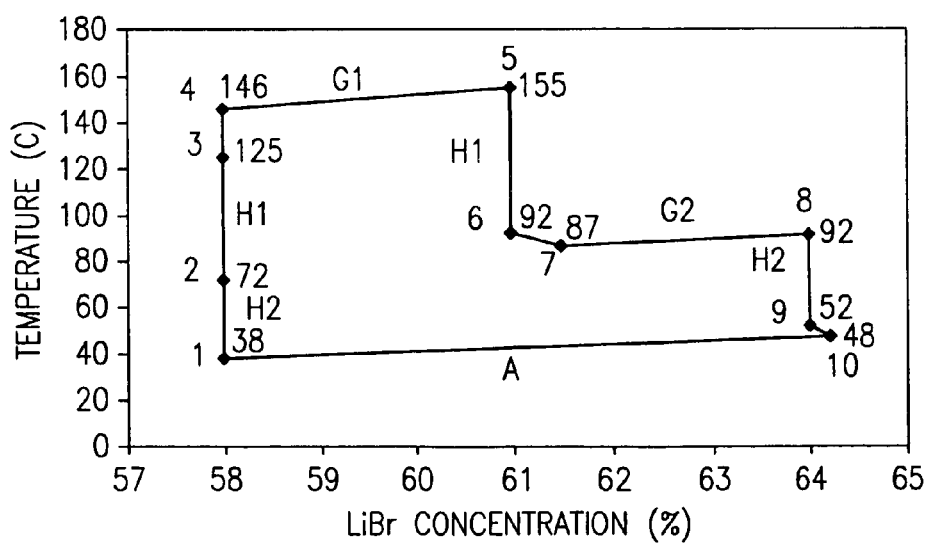
FIG. 2 illustrates a typical forward series absorption cooling cycle with LiBr-water.

FIG. 1 of the drawings illustrates a typical forward series absorption chiller cycle operating in cooling mode, using LiBr-water as the working fluid. FIG. 2 shows a T-X diagram for the cycle of FIG. 1.

The absorption cycle can be explained as follows. Weak lithium bromide (LiBr) solution leaving absorber (A) is heated from point 1 to point 2 in a low temperature heat exchanger (H2), while cooling strong solution leaving low stage generator (G2) from point 8 to point 9. Weak solution leaving H2 is heated to point 3 in high temperature using heat to cool strong solution from point 5 to point 6. Weak solution leaving H1 is preheated to point 4 and then steam is generated to increase solution concentration to point 5 in G1. Steam generated in G1 is condensed in G2 tubes, while producing lower pressure steam in G2 shell-side, thus increasing the concentration of solution from point 7 to point 8. Processes 6–7 and 9–10 are flashing processes where superheated solution is brought into a lower pressure environment, thus producing steam as a result of isenthalpic expansion. Ideally, H1 and H2 should be designed such that there is no flashing. FIG. 2 shows nominal temperatures of various state points in the absorption cycle under consideration.

Heat exchanger effectiveness of H1 and H2 are defined as the ratio of actual rate of energy transfer to theoretical maximum rate of energy transfer. This is calculated as the ratio of temperature difference of fluid steam having a lower value of $m.c_p$ (where m is mass flow rate and cp is specific heat), to the difference between entering temperature of strong and weak solution. For example, in this particular case, $m.c_p$ of strong solution is lower than $m.c_p$ of weak solution. Hence, the effectiveness of H1 is calculated as $\epsilon=(155-92)/(155-72)=75.9\%$. Effectiveness of H2 is calculated as $\epsilon=(92-52)/(92-38)=74.1\%$. Effectiveness of these heat exchangers play a key role in determining overall COP of absorption cycle.

External energy is supplied to the cycle in the G1, which is utilized in preheating solution from point 3–4 and then generating steam from point 4–5. If effectiveness of H1 and H2 is increased, then the amount of energy utilized in preheating solution from 3–4 can be minimized. However, in doing so, the temperature of point 9 can reduce significantly to a level such that there may be a danger of crystallization of strong solution. For example, crystallization temperature of 64% solution is 38.2C. If H2 has a 95% effectiveness, the leaving temperature of point 9 would be 40.7C. Improving effectiveness of H2 would increase risk of crystallization in H2 strong solution.

Figure 5:
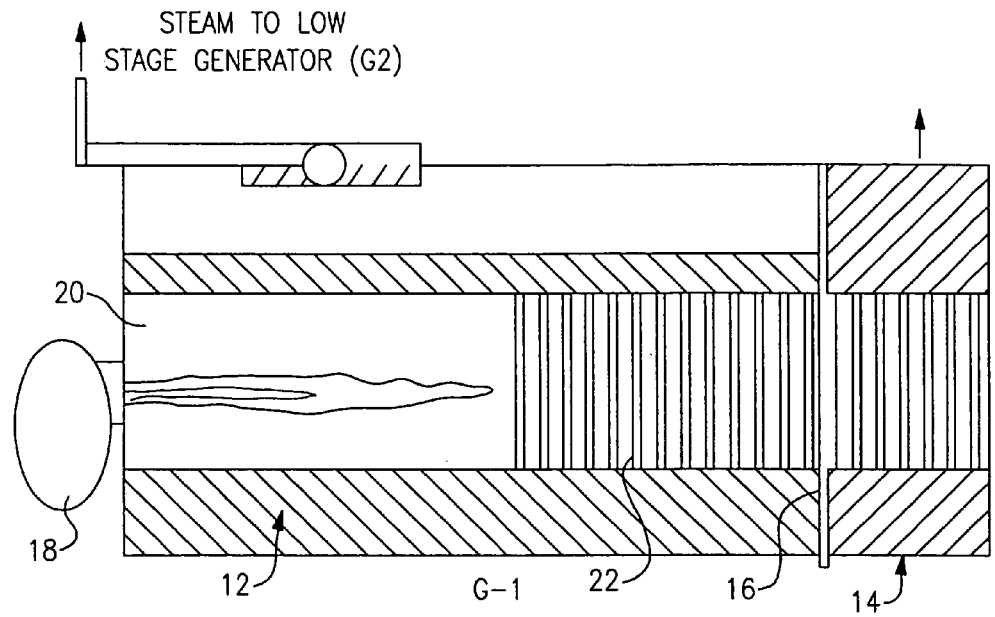
FIG. 5 is a sectional view which illustrates a high stage generator modified design of the present invention.

In a direct fired absorption chiller, flue gas leaving G1 is at a relatively high temperature (around 190C). Considerable amount of energy can be recovered from this flue gas if utilized effectively. FIG. 5 illustrates a modified G1 design that can allow such energy recovery.

Figure 3:
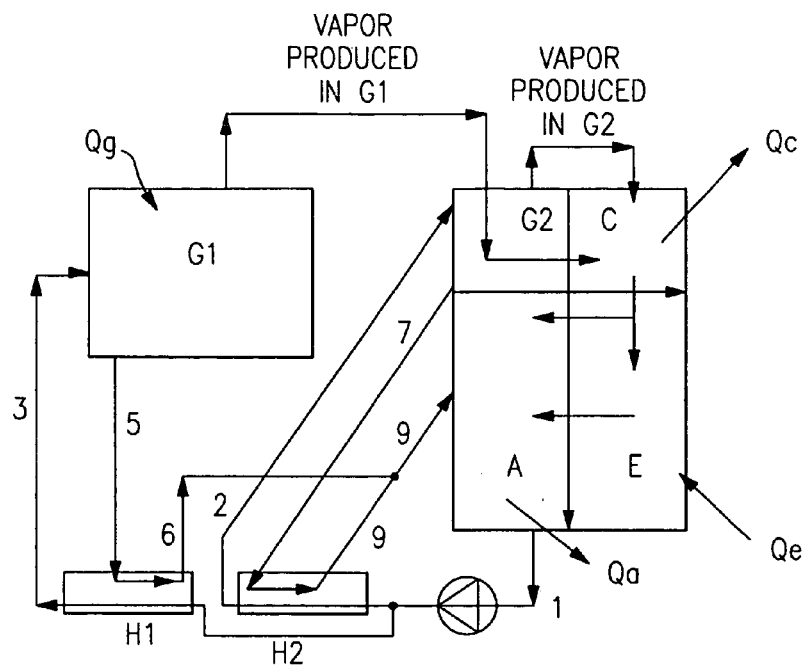
FIG. 3 illustrates a schematic of a parallel series absorption chiller cycle.
Figure 4:
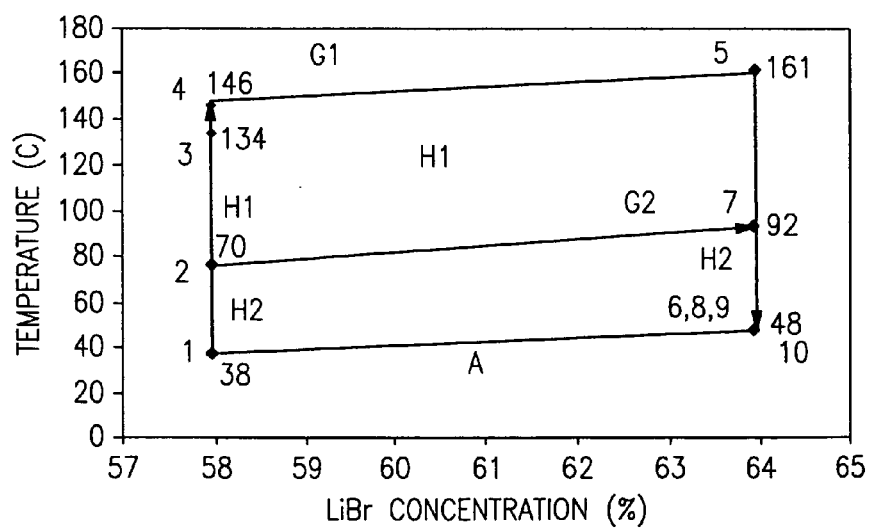
FIG. 4 illustrates a typical parallel absorption cooling cycle with LiBr-water.

The absorption cycle illustrated in FIGS. 3 and 4 is explained as follows. Weak solution leaving absorber (A) is split into two streams. One stream is heated from point 1 to point 2 in a low temperature heat exchanger (H2), while cooling strong solution leaving low stage generator (G2) from point 7 to point 8. Other stream leaving absorber is heated to point 3 in high temperature heat exchanger (H1), while cooling strong solution leaving high stage generator (G1) from point 5 to point 6. Weak solution leaving H1 is preheated to point 4 and then steam is generated to increase solution concentration to point 5 in G1. Steam generated in G1 is condensed in G2 tubes, while producing lower pressure steam in G2 shell-side, thus increasing concentration of solution from point 2 to point 7. FIG. 1 shows nominal temperatures of various state points in the absorption cycle under consideration.

External energy is supplied to the cycle in the G1, which is utilized in preheating solution from point 3–4 and then generating steam from point 4–5. If effectiveness of H1 and H2 is increased, then the amount of energy utilized in preheating solution from 3–4 can be minimized. However, in doing so, the temperature of point 8 can reduce significantly to a level such that there may be a danger of crystallization of strong solution. For example, crystallization temperature of 64% solution is 38.2C. If we use H2 of 95% effectiveness, the leaving temperature of point 9 would be 40.7C. Improving effectiveness of H2 would increase risk of crystallization in H2 strong solution.

FIG. 5 is a side sectional view of a high stage generator G1 of the present invention in which the solution side of the generator is divided into two sections 12 and 14 by a partition plate 16. Burner 18 provides a flame into the fire section 20, with the smoke section designated 22. The section on the left-hand side of the partition plate in FIG. 5 is a typical configuration of G1. Flue gas leaves G1 at a high temperature (190C). It can be further cooled to a lower temperature depending on the source for low temperature solution. This section will hereinafter be identified as the flue gas recuperator (FGR). Typical G1 has 80–82% burner efficiency, which means 18–20% of available energy in fuel is wasted in the form of hot exhaust gas. If half of this waste energy is utilized in the cycle, the COP of cycle can be improved significantly. The following embodiments of the present invention illustrate the use of this modified design.

Embodiment 1: Heat Solution Leaving Absorber (Point 1)

Figure 6C:
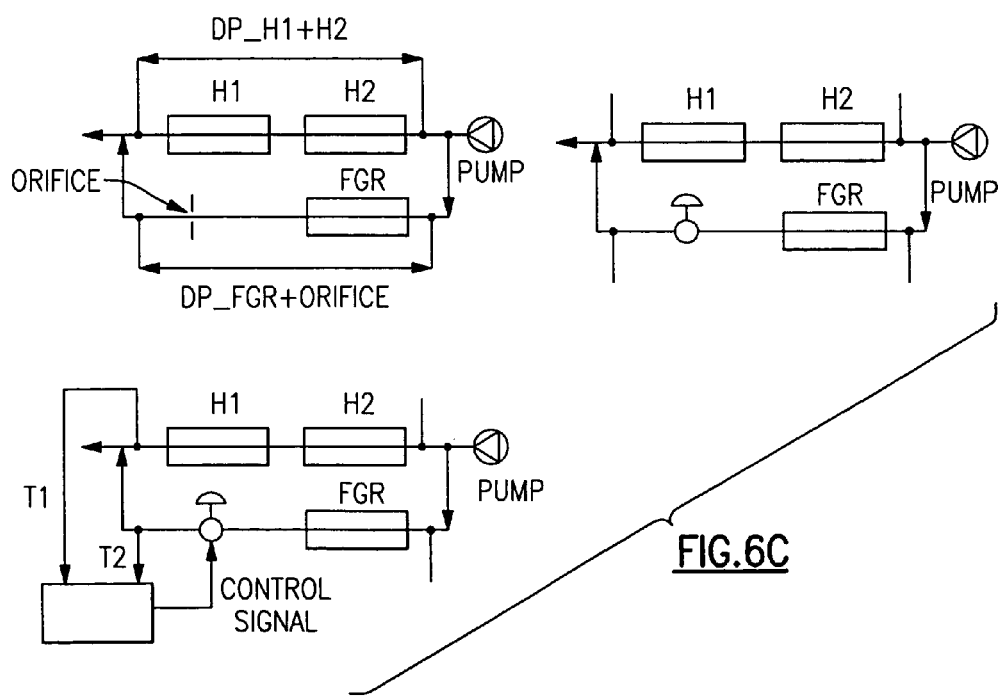
FIG. 6(c) illustrates schematic options for embodiment 2.
Figure 6A:
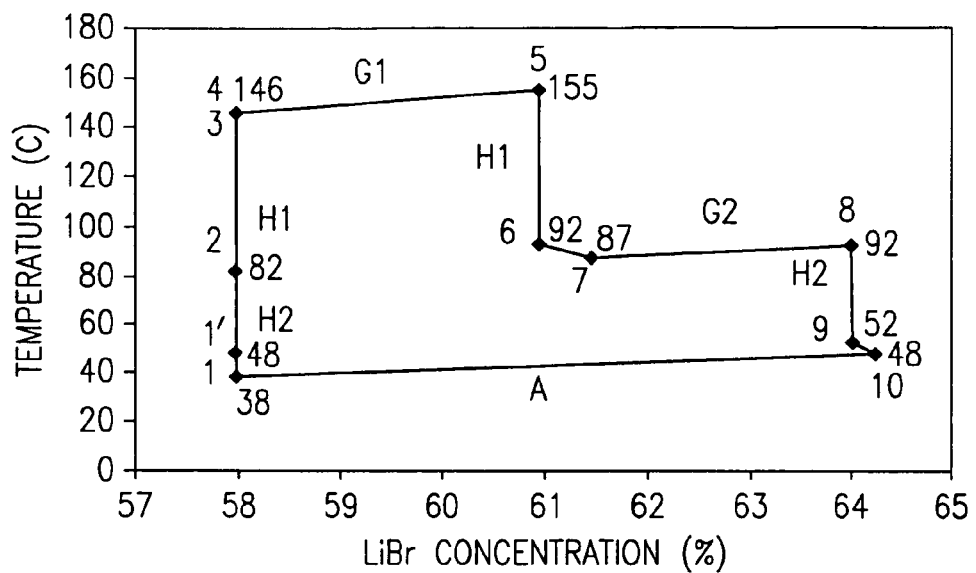
FIGS. 6(a) and (b) are schematic illustrations tracing the heating solution leaving absorber in a flue gas recuperator of the present invention, and the corresponding T-X diagram.
Figure 6B:
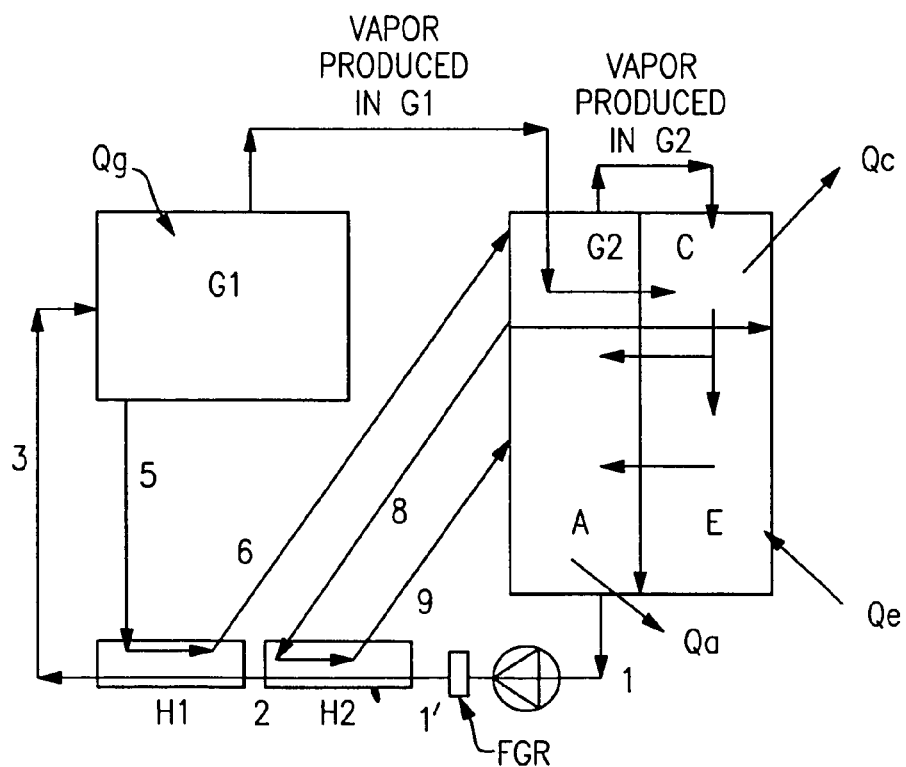

This embodiment is illustrated in FIGS. 6(*a*) and (*b*). Solution leaves absorber at 38° C. As can be seen from FIG. 6(*a*), this is the coldest point in the cycle. If half of the waste heat is utilized, the temperature of solution can be raised from 38° C. to 48° C. in the FGR. This will enable the use of H2 at very high effectiveness, without any danger of crystallization, because the cold-side temperature will be always higher than crystallization temperature of the solution.

Embodiment 2: Split a Stream of Solution Leaving Absorber

Figure 7A:
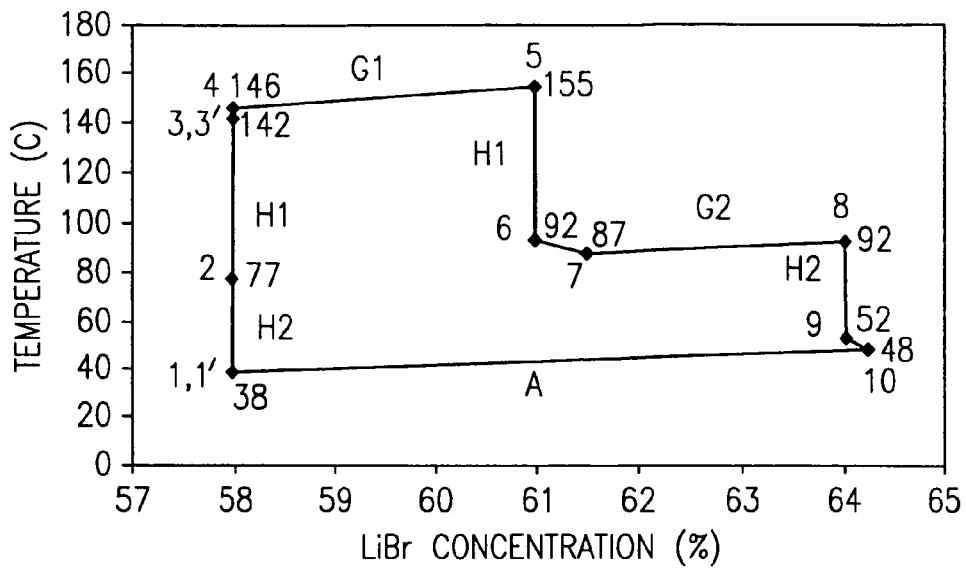
FIGS. 7(a) and (b) are schematic illustrations utilizing a flue gas recuperator to heat bypassed solution, and the corresponding T-X diagram.
Figure 7B:
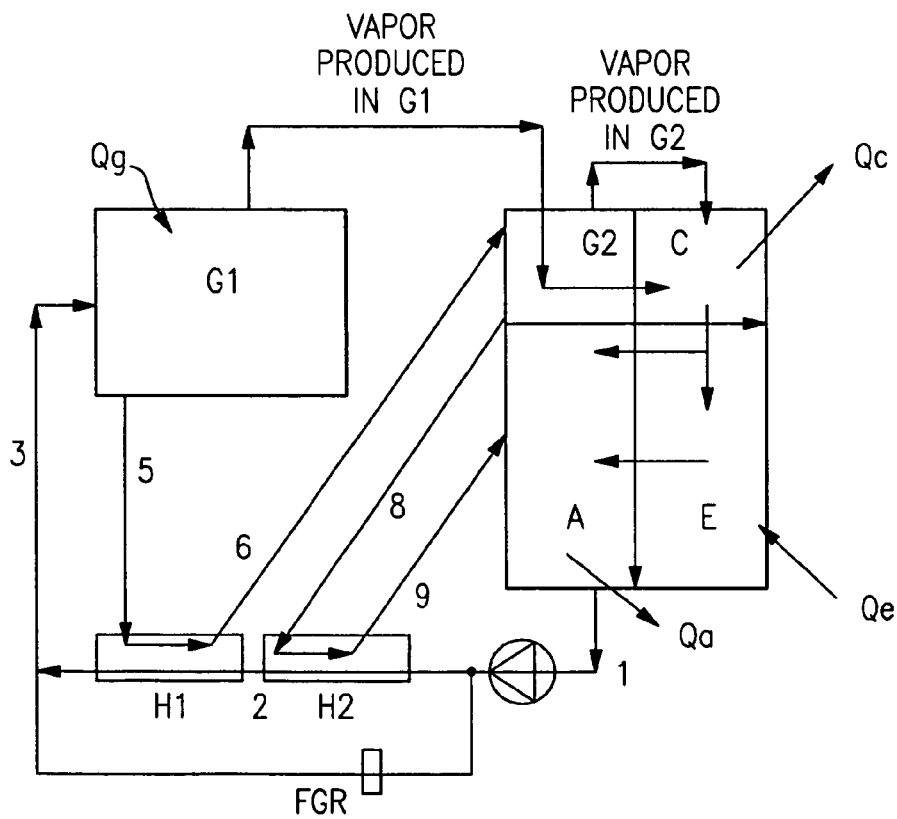

As shown in FIG. 7(*b*), a fraction of total solution flow leaving the absorber is passed through the FGR. If 10% of total energy input is recovered in FGR, and 10% of solution flow rate leaving absorber is bypassed in the FGR, then temperatures as shown in FIG. 7(*b*) can be achieved. Note that 1'–3' is the heating of solution with FGR. In this situation, the risk of crystallization is the same as the baseline case of FIG. 1.

Embodiment 3: Split a Stream of Weak Solution Leaving H2

Figure 8A:
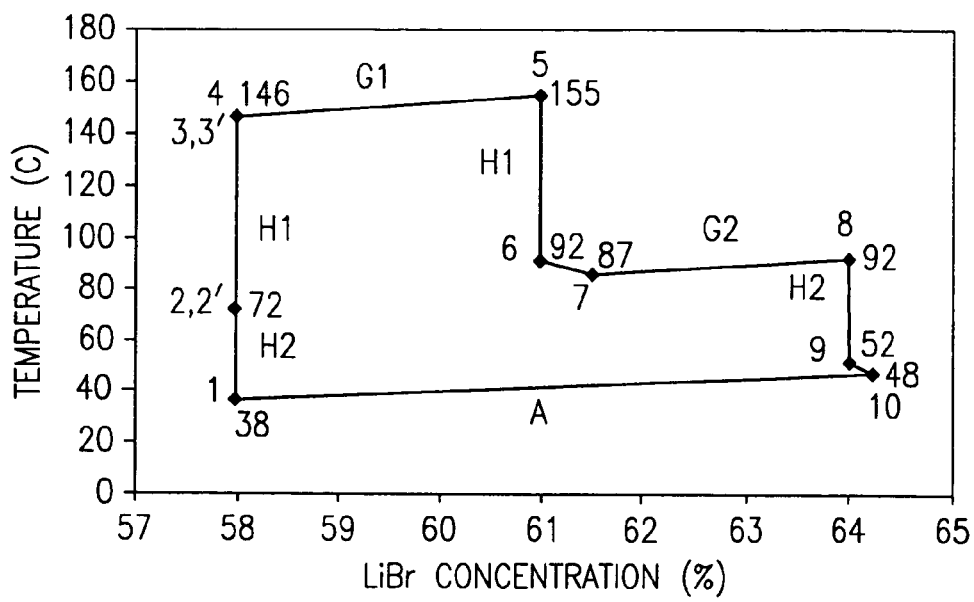
FIGS. 8(a) and (b) are schematic illustrations illustrating heating bypassed weak solution leaving heat exchanger 2, and the corresponding T-X diagram.
Figure 8B:
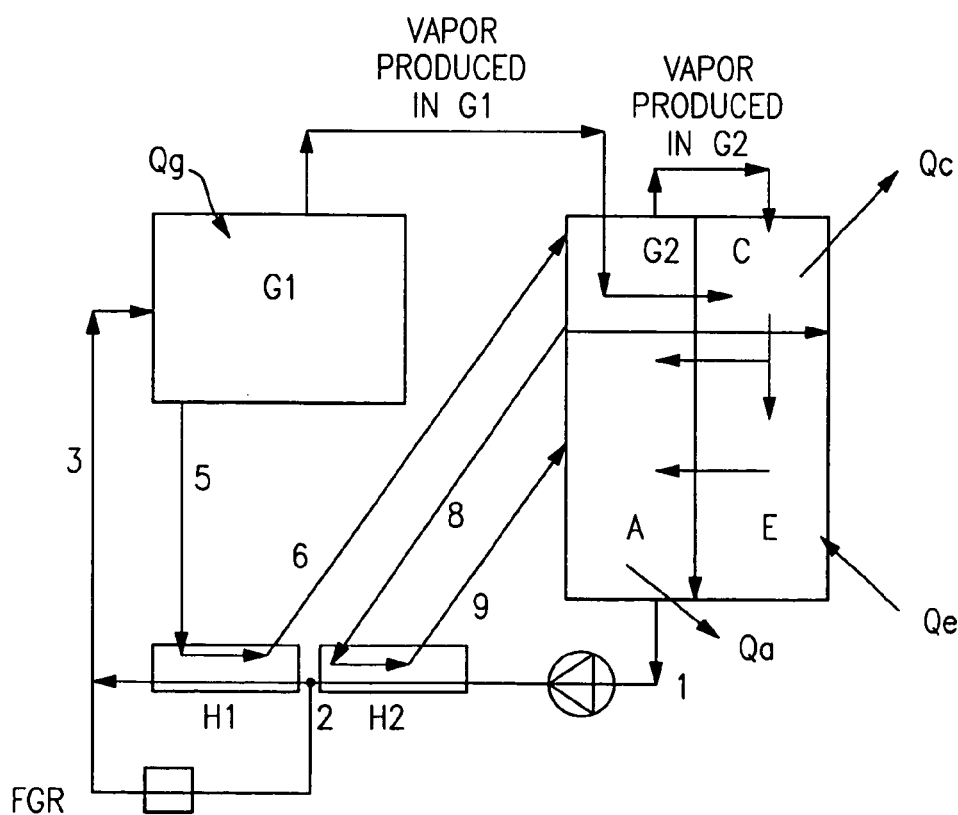

This embodiment is illustrated in FIGS. 8(*a*) and (*b*). It is similar to Embodiment 2, except instead of splitting a stream of solution leaving the absorber, a stream of weak solution is split leaving H2. In this case, the H2 leaving solution temperature is still at 72° C., but the split stream is heated with the FGR to 145° C., and the rest of the solution is heated to 145C in H1. In this embodiment, 2–3 is heating carried out in H1 while 2'–3' is heating in the FGR.

In embodiments 2 and 3, weak solution entering low temperature heat exchanger (H2) or high temperature heat exchanger (H1) is heated in FGR. Heated weak solution leaving FGR is mixed with either weak solution leaving H2 or weak solution leaving H1. It is important to bring the temperature of heated solution leaving FGR in close proximity to the temperature of solution in which it is being mixed to avoid mixing losses and improve thermodynamic efficiency of absorption cycle. This can be accomplished by two methods. First method is mechanical device such as a fixed orifice or a field adjustable valve. Second method is an electronically controlled valve.

FIG. 6(*c*) shows a scheme for embodiment 2, where heated solution from FGR is mixed with heated weak solution leaving H1. At full load, flue gas leaving high stage generator at full load is typically at 190–210C depending on efficiency of high stage generator. Weak solution leaving absorber is at typically at 38C. Assuming flue gas temperature leaving high stage generator of 200C; and assuming 80% effectiveness of FGR, temperature of flue gas leaving FGR would be 70C. For natural gas with 20% excess air, net burner efficiency can be improved from 82.4% to 88%. Knowing the amount of energy that can be recovered in FGR, the fraction of flow entering in FGR can be calculated such that temperature of solution leaving FGR and leaving H1 is equal. A FGR is then designed to recuperate desired heat with the calculated solution flow rate in the FGR. Pressure drop in weak solution flow is then calculated for parallel flow paths going through FGR and going through H2 and H1. An orifice is added in the solution line that has lower pressure drop such that pressure drops in both parallel flow paths are equalized. In the case of an electronically controlled valve, two temperature sensors are used to detect temperatures of two mixing streams. The valve position is determined by opening or closing valve such that temperatures of two mixing streams is equalized with use of a controller.

Embodiment 4: Using Flue Gas to Generate Steam in G2

Figure 9:
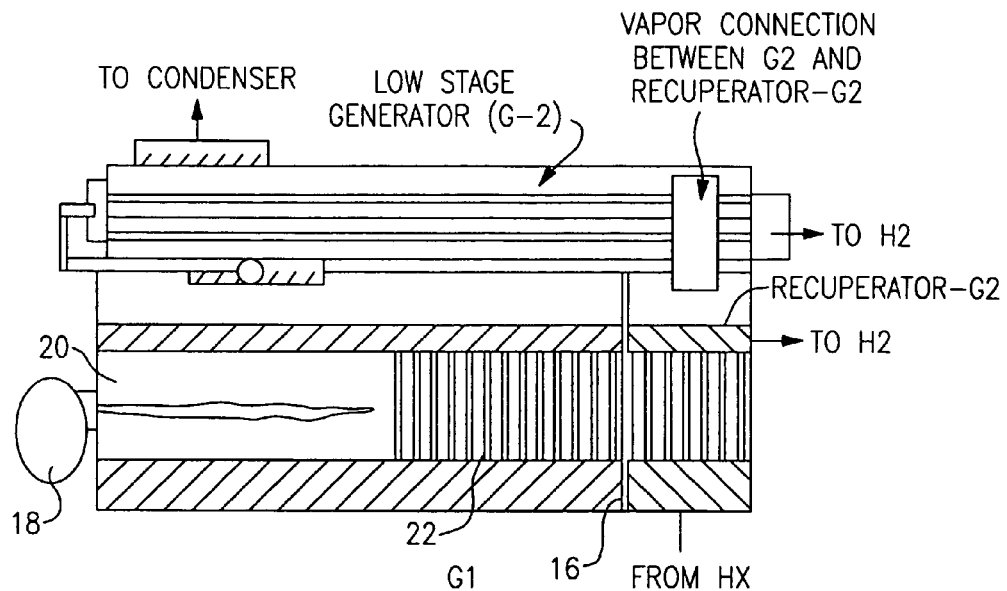
FIG. 9 is a sectional view which illustrates the use of a flue gas recuperator as an auxiliary generator.

It is possible to use 190C flue gas to generate steam in G2 where solution temperature is 87–92C. FIG. 9 illustrates a sketch of such configuration with elements 16, 18, 20 and 22 being like elements as in FIG. 5.

Figure 10:
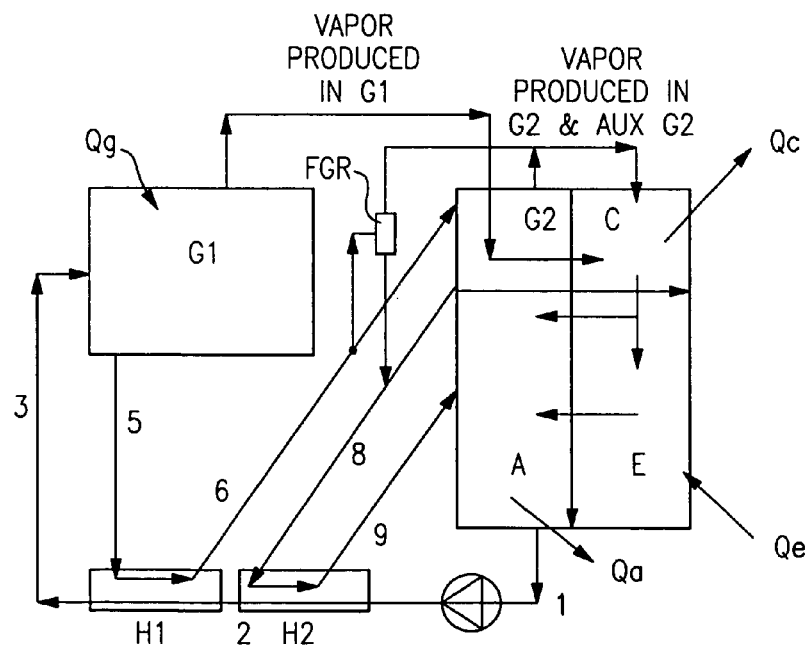
FIG. 10 is a schematic illustration of the cycle using a flue gas recuperator as an auxiliary generator.

As shown schematically in FIG. 10, part of the solution entering conventional G2 is bypassed to FGR. The FGR operates similar to G1, as thermosiphon reboiler or flooded evaporator depending on the design. Its vapor side is connected to the vapor side of conventional G2 such that both G2 and FGR operate at equal pressure. This FGR is termed as "recuperator-G2" or "auxiliary G2."

Embodiment 5

Figure 11A:
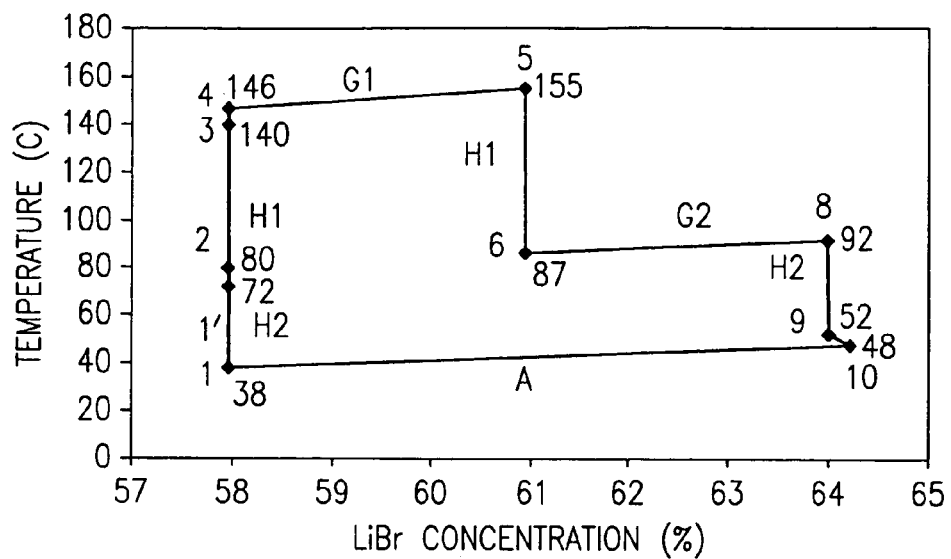
FIGS. 11(a) and (b) are schematic illustrations tracing the heating solution leaving $H_2$ in FGR and corresponding T-X diagram.
Figure 11B:
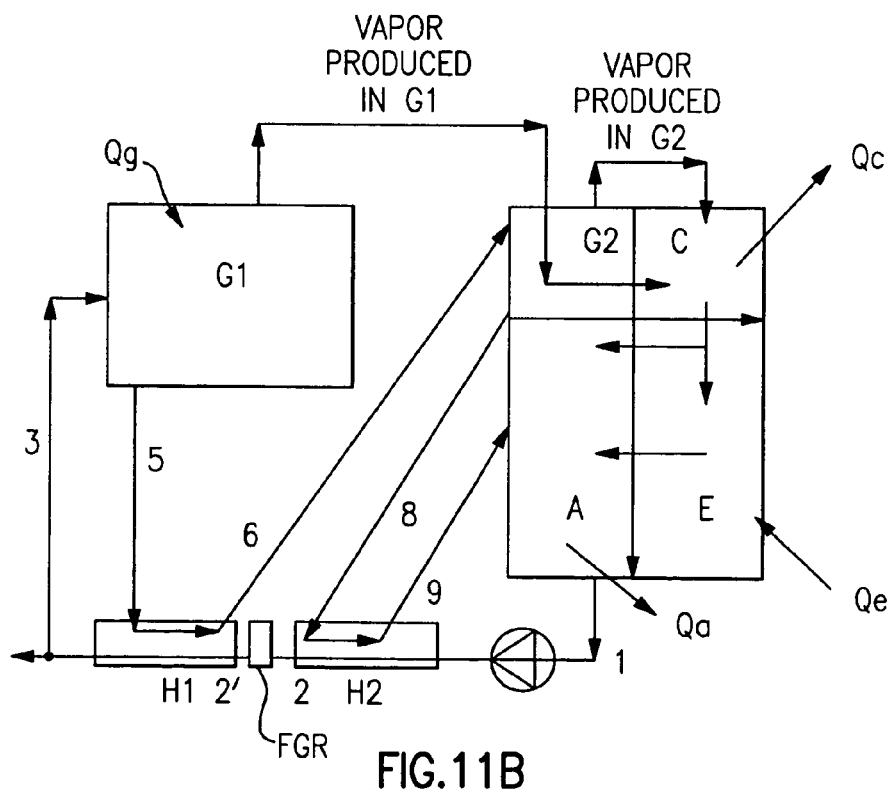

FIGS. 11(a) and (b) illustrates this embodiment. In this option, weak solution leaving H2 is passed through FGR. Temperature of weak solution leaving H2 is generally between 55C at minimum load to 72–80C at full load depending on the effectiveness of H2. For example, in a series cycle, heating weak solution leaving H2 from 72C to 78C in FGR can help recuperate waste heat from exhaust gas. In order to utilize this heat effectively, it is important to use H1 heat exchanger of higher effectiveness such that strong solution leaving H1 is sufficiently cooled to temperature in the absence of such FGR. The reason for doing so is to avoid excessive flashing of strong solution entering into low stage generator, a situation that can negate the purpose of using FGR for flue gas recuperation. The main advantage of this method is that temperature of heat transfer surface of FGR that is in contact with flue gas can be maintained above dew point of flue gas. Therefore, moisture condensation on heat transfer surface is avoided. This is important to avoid corrosion of heat transfer surface with flue gas condensation, and an ordinary material such as carbon steel can be used. In the case of option 1 or 2, flue gas condensation is possible, and hence special corrosion resistant alloy material such as low carbon stainless steel is necessary. Option 5, thus offers a low-cost method for flue gas recuperation.

Embodiment 6

Figure 12A:
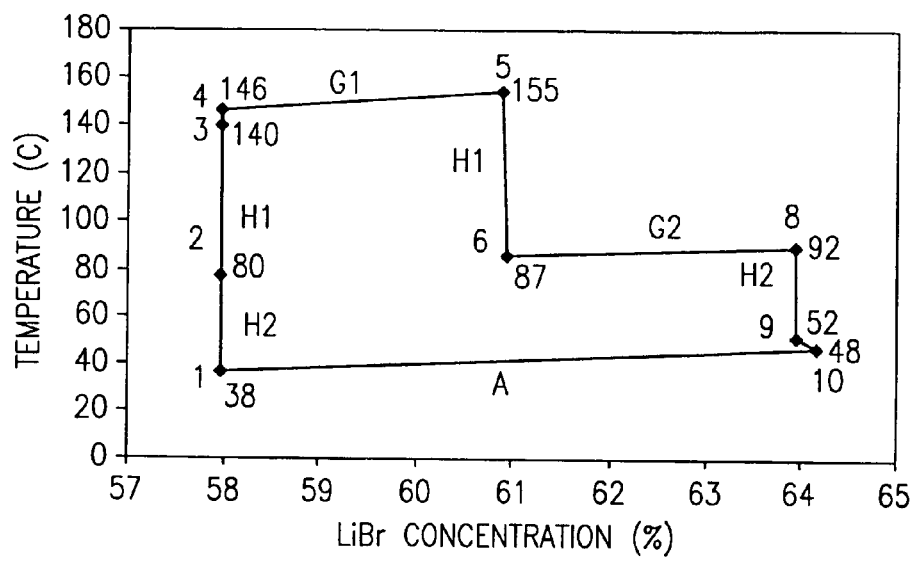
FIGS. 12(a) and (b) are schematic illustrations tracing the heating solution leaving the absorber in FGR in parallel to H2 and the corresponding T-X diagram.
Figure 12B:
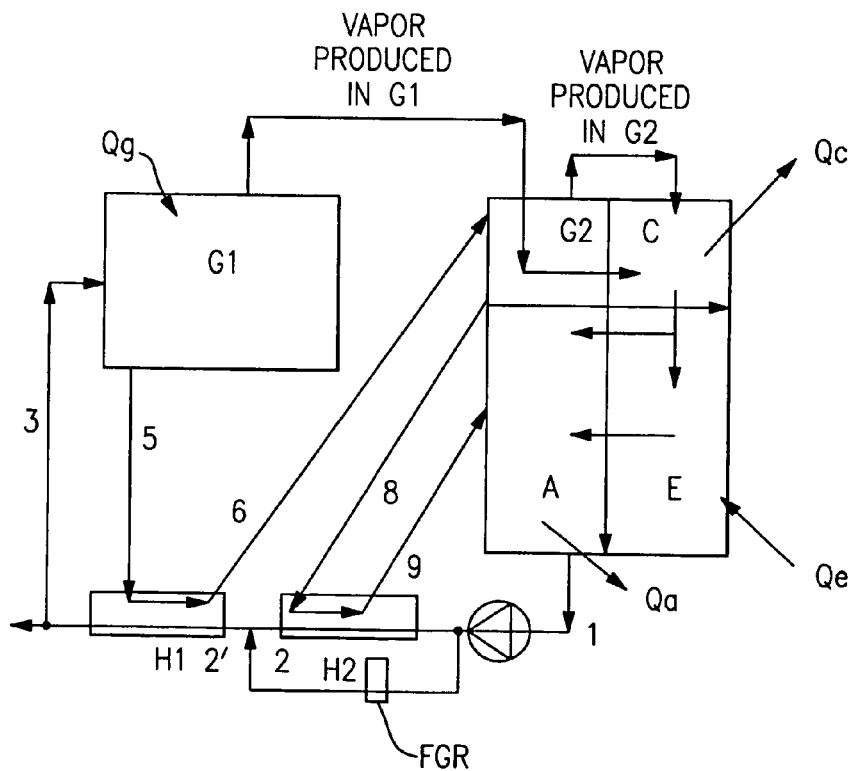

FIGS. 12(a) and (b) illustrates this embodiment. This is similar to embodiment 2. In this option, solution flow circulating in the absorption cycle is split into two portions. One portion exchanges heat with strong solution in H2 while other portion exchanges heat with flue gas in FGR. The portions are determined such that temperature of weak solution leaving FGR and leaving H2 are approximately equal. These two solution streams are mixed and the mixed stream then enters high temperature heat exchanger.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed:

1. In an absorption cooling system of the type which uses a refrigerant and an absorbent solution and which includes a high stage generator, absorber, condenser, heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, and where the entire solution leaving the absorber is passed through the FGR.

2. In an absorption cooling system of the type which uses a refrigerant and an absorbent solution and which includes a high stage generator, absorber, condenser, heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, in which a fraction of the solution leaving the absorber is passed through the FGR.

3. In an absorption cooling system of the type which uses a refrigerant and an absorbent solution and which includes a high stage generator, absorber, condenser, a high temperature heat exchangers, a low temperature hat exchanger, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, in which the stream of weak solution leaving said low temperature heat exchanger is split with a fraction of said solution being heated in the FGR.

4. In an absorption cooling system of the type which uses a refrigerant and an absorbent solution and which includes a high stage generator, a low stage generator, absorber, condenser, heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, in which part of the solution entering said low stage generator is bypassed to the FGR.

5. In an absorption cooling system of the type which uses a refrigerant and an absorbent solution and which includes a high stage generator, absorber, condenser, heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency and where all of the weak solution that is circulated in the absorption cycle is passed through the FGR before entering in low temperature heat exchanger to exchange heat with exhaust gas leaving high stage generator section to eliminate the danger of crystallization of strong solution in the low temperature heat exchanger.

6. In an absorption cooling system of the type which uses a refrigerant and an absorbent solution and which includes a high stage generator, absorber, condenser, high temperature heat exchangers, a low temperature heat exchanger and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, and where a fraction of weak solution that is circulated in the absorption cycle is passed through the FGR to exchange heat with exhaust gas leaving the high stage generator section.

7. The system of claim 6 in which solution leaving the FGR is mixed with heated weak solution leaving the said high temperature heat exchanger.

8. The system of claim 7 in which the fraction of solution passing through the FGR is such that temperature of solution leaving FGR is =/−10 degree C. when comparted to temperature of heated weak solution leaving the high temperature exchanger.

9. The system in claim 8 in which the fraction of solution flow entering the FGR is determined by use of an orifice.

10. The system in claim 8 in which the fraction of solution flow entering the FGR is determined by use of a mechanical valve.

11. The system in claim 8 in which the fraction of solution flow entering the FGR is determined by use of an electronically controlled valve.

12. The system of claim 6 in which solution leaving the FGR is mixed with heated weak solution leaving the said low temperature heat exchanger.

13. The system of claim 12 in which the fraction of solution passing through the FGR is such that the temperature of solution leaving the FGR is +/−5 degree C. when compared to temperature of heated weak solution leaving low temperature heat exchanger.

14. The system in claim 13 in which the fraction of solution flow entering the FGR is determined by use of an orifice.

15. The system in claim 13 in which the fraction of solution flow entering the FGR is determined by use of a mechanical valve.

16. The system in claim 13 in which the fraction of solution flow entering the FGR is determined by use of an electronically controlled valve.

17. In an absorption cooling system of the type which uses a refrigerant and an absorbent solution and which includes a high stage generator, absorber, condenser, high and low temperature heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, and where a fraction of the stream of the weak solution leaving the low temperature heat exchanger is passed through the FGR to exchange heat with exhaust gas leaving the high stage generator section.

18. In an absorption cooling system of the type which uses a refrigerant and an absorbent solution and which includes a high stage generator, absorber, condenser, high and low temperature heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency, and where the fraction of solution passing through the FGR is such that the temperature of the solution leaving the FGR is +/−5 degree C. when compared to the temperature of the heated weak solution leaving the high temperature heat exchanger.

19. In an absorption cooling system of the type which uses a refrigerant and an absorbent solution and which includes a high stage generator, a low stage generator, absorber, condenser, high and low temperature heat exchangers, and an evaporator and means for connecting said components to one another to form a closed absorption cooling system with said solution side of said high stage generator being fluidically divided with a partition plate into two sections of substantially identical construction whereby gas exiting one section at relatively high temperature is further cooled in the second section which functions as a flue gas recuperator (FGR) to improve overall burner efficiency and where a fraction of the solution entering the said low stage generator is bypassed to exchange heat in the FGR to produce refrigerant vapor.

20. The system in claim 19 in which the fraction of the solution entering FGR is such that concentration of solution leaving FGR is equal to concentration of solution leaving low stage generator.

21. The system in claim 19 in which the fraction of solution entering the FGR is such that the absorbent concentration of solution leaving the FGR is within +/0.5 percent absolute when compared to the absorbent concentration of solution leaving the low stage generator.

22. The system of claim 19 in which the vapor portion of the FGR and vapor portion of the low stage generator are fluidically connected to operate at a pressure difference not exceeding 0.2 torr.

* * * * *

UNITED STATES PATENT AND TRADEMARK OFFICE
CERTIFICATE OF CORRECTION

PATENT NO. : 6,877,338 B2
DATED : April 12, 2005
INVENTOR(S) : Neelkanth S. Gupte It is certified that error appears in the above-identified patent and that said Letters Patent is hereby corrected as shown below:

Column 6,
Line 37, after the word "temperature" the word "hat" is incorrect please replace with the word -- heat --.

Column 8,
Line 43, after the word "entering" the word "the" should have been omitted.

Signed and Sealed this

Twenty-eighth Day of June, 2005

JON W. DUDAS
*Director of the United States Patent and Trademark Office*